United States Patent
Zhu (10) Patent No.: US 10,534,221 B1
(45) Date of Patent: Jan. 14, 2020

(54) DISPLAY MODULE AND DISPLAY DEVICE (71) Applicant: XIAMEN TIANMA MICRO-ELECTRONICS CO., LTD., Xiamen (CN)

(72) Inventor: Zhiqiang Zhu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/279,210

(22) Filed: Feb. 19, 2019

(30) Foreign Application Priority Data

Dec. 11, 2018 (CN) .......................... 2018 1 1509197

(51) Int. Cl.
G09F 13/04 (2006.01)
G02F 1/13357 (2006.01)
G02F 1/1333 (2006.01)
G02F 1/1335 (2006.01)

(52) U.S. Cl.
CPC .. *G02F 1/133608* (2013.01); *G02F 1/133308* (2013.01); *G02F 1/133528* (2013.01)

(58) Field of Classification Search
None
See application file for complete search history.

(56) References Cited

U.S. PATENT DOCUMENTS

2016/0202516 A1* 7/2016 Watanabe ............. G02F 1/1339
349/130

FOREIGN PATENT DOCUMENTS

CN 108681131 A 10/2018
CN 108681150 A 10/2018

* cited by examiner

*Primary Examiner* — Vip Patel
(74) *Attorney, Agent, or Firm* — Anova Law Group PLLC (57) ABSTRACT Display module and display device are provided. The display module includes a cover plate, a display screen, and a backlight module. The display screen includes a display region, a first non-display region, and at least one first hollowed-out part. The at least one first hollowed-out part penetrates through the display screen. The backlight module includes a metal frame and at least one second hollowed-out part penetrating through the backlight module. The metal frame includes a main part and a first bending part connected to the main part. The first bending part is disposed on inner sidewalls of the at least one second hollowed-out part and is opaque. The first bending part intersects a plane for the main part; and one end of the first bending part away from the main part extends inside the at least one first hollowed-out part.

19 Claims, 11 Drawing Sheets

DISPLAY MODULE AND DISPLAY DEVICE

CROSS-REFERENCES TO RELATED APPLICATION

This application claims the priority of Chinese Patent Application No. 201811509197.6, filed on Dec. 11, 2018, the content of which is incorporated herein by reference in its entirety.

TECHNICAL FIELD

The present disclosure generally relates to the field of display technology and, more particularly, relates to a display module and a display device.

BACKGROUND

A backlight module is one of key components in a liquid crystal display and provides a homogenous light source with enough brightness for the liquid crystal display. A light-emitting performance of the backlight module directly affects a visual effect of the liquid crystal display. With continuous development of liquid crystal display technologies, application fields of liquid crystal displays, especially of colorful liquid crystal displays, are also continuously expanding. Driven by a market of the liquid crystal display devices, a backlight industry also develops prosperously. The liquid crystal display is a non-luminescent display device and the backlight module is necessary for display. Performance of the backlight module directly affects a display quality of the liquid crystal display. A cost of the backlight module accounts for about 30% to about 50% of a whole cost of the liquid crystal display module, and the backlight module consumes about 75% of a total power consumed by the liquid crystal display module. The backlight module plays an important role in the liquid crystal display module. High-definition, large-size liquid crystal displays must be cooperated with high-performance backlight technology. When the liquid crystal display industry is striving to expand new applications, the backlight module technology with a high performance (such as high brightness, low cost, low power consumption, thin thickness, light weight, and so on) plays the role of a backstage hero.

With continuous development of display panels, people are no longer satisfied with conventional performance indicators of the display panels such as large size and high definition, but have more diverse requirements on a shape of the display panels. So irregularly-shaped display panels and corresponding irregularly-shaped backlight modules have emerged. For example, a hollowed-out region for accommodating cameras may be formed in a backlight module. In this case, if the backlight module still adopts its original structure, light emitted by the backlight module may likely leak out to a position of the cameras and may affect an optical effect of the cameras.

The disclosed display module and display device are directed to solve one or more problems set forth above and other problems.

SUMMARY

One aspect of the present disclosure provides a display module. The display module includes a cover plate, a display screen on a side of the cover plate, and a backlight module on a side of the display screen away from the cover plate. The display screen includes a display region, a first non-display region, and at least one first hollowed-out part. The at least one first hollowed-out part penetrates through the display screen along a thickness direction of the display screen. The first non-display region at least partially surrounds the at least one hollowed-out part. The display region at least partially surrounds the first non-display region. The backlight module includes at least one second hollowed-out part and a metal frame. The at least one second hollowed-out part is disposed in a one-to-one correspondence with the at least one first hollowed-out part. The at least one second hollowed-out part penetrates through the backlight module along a thickness direction of the backlight module. The metal frame includes a main part corresponding to the display region and a first bending part connected to the main part. The first bending part is disposed on inner sidewalls of the at least one second hollowed-out part and is opaque. The first bending part intersects a plane for the main part; and one end of the first bending part away from the main part extends inside the at least one first hollowed-out part.

Another aspect of the present disclosure provides a display device. The display device includes a display module configured with a cover plate, a display screen on a side of the cover plate, and a backlight module on a side of the display screen away from the cover plate. The display screen includes a display region, a first non-display region, and at least one first hollowed-out part. The at least one first hollowed-out part penetrates through the display screen along a thickness direction of the display screen. The first non-display region surrounds or semi-surrounds the at least one hollowed-out part. The display region surrounds or semi-surrounds the first non-display region. The backlight module includes at least one second hollowed-out part and a metal frame. The at least one second hollowed-out part is disposed in a one-to-one correspondence with the at least one first hollowed-out part. The at least one second hollowed-out part penetrates through the backlight module along a thickness direction of the backlight module. The metal frame includes a main part corresponding to the display region and a first bending part connected to the main part. The first bending part is disposed on inner sidewalls of the at least one second hollowed-out part and is opaque. The first bending part intersects a plane for the main part; and one end of the first bending part away from the main part extends inside the at least one first hollowed-out part.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the present disclosure. Furthermore, a three-dimensional (3D) size including length, width and depth should be considered during practical fabrication.

With continuous development of display panels, people are no longer satisfied with conventional performance indicators of the display panels such as large size and high definition, but have more diverse requirements on the shape of the display panels. So irregularly-shaped display panels and corresponding irregularly-shaped backlight modules emerged. For example, a hollowed-out region for accommodating cameras may be formed in a backlight module. In this case if the backlight module still adopts its original structure, light emitted by the backlight module is likely to leak out to a position of the cameras and may affect an optical effect of the cameras.

The present disclosure provides a display module. In the display module, a first bending part in a metal frame of a backlight module may be opaque and may extend inside at least one first hollowed-out part of a display panel. Correspondingly, light beams emitted by the backlight module may not leak out to a position corresponding to the at least one first hollowed-out part and a position corresponding to at least one second hollowed-out part. When cameras are disposed in the position corresponding to the at least one first hollowed-out part and the position corresponding to the at least one second hollowed-out part, an optical effect of the cameras may not be interfered.

The display module may include: a cover plate, a display screen at a side of the cover plate, and a backlight module. The display screen may include a display region, a first non-display region, and at least one first hollowed-out part penetrating through the display screen along a thickness direction of the display screen. The first non-display region may at least partially surround the at least one hollowed-out part, and the display region may at least partially surround the first non-display region. The backlight module may be disposed at a side of the display screen away from the cover plate and may include at least one second hollowed-out part. The at least one second hollowed-out part may be disposed in a one-to-one correspondence in position with the at least one first hollowed-out part. The at least one second hollowed-out part may penetrate through the backlight module along a thickness direction of the backlight module. The backlight module may further include a metal frame. The metal frame may include a main part corresponding to the display region and a first bending part. The first bending part may be connected to the main part and may be disposed on inner sidewalls of the at least one second hollowed-out part. The first bending part may be opaque and may intersect a plane for the main part. One end of the first bending part away from the main part may extend inside the at least one first hollowed-out part.

Figure 1:
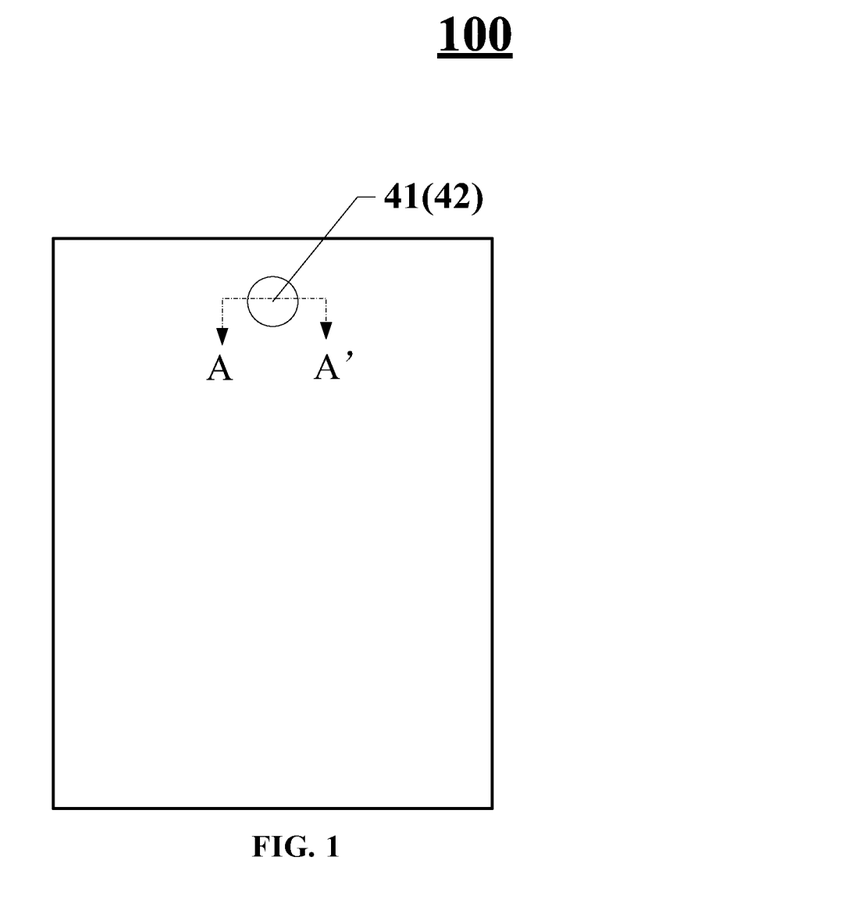
FIG. 1 illustrates a top view of an exemplary display module consistent with various disclosed embodiments in the present disclosure.
Figure 2:
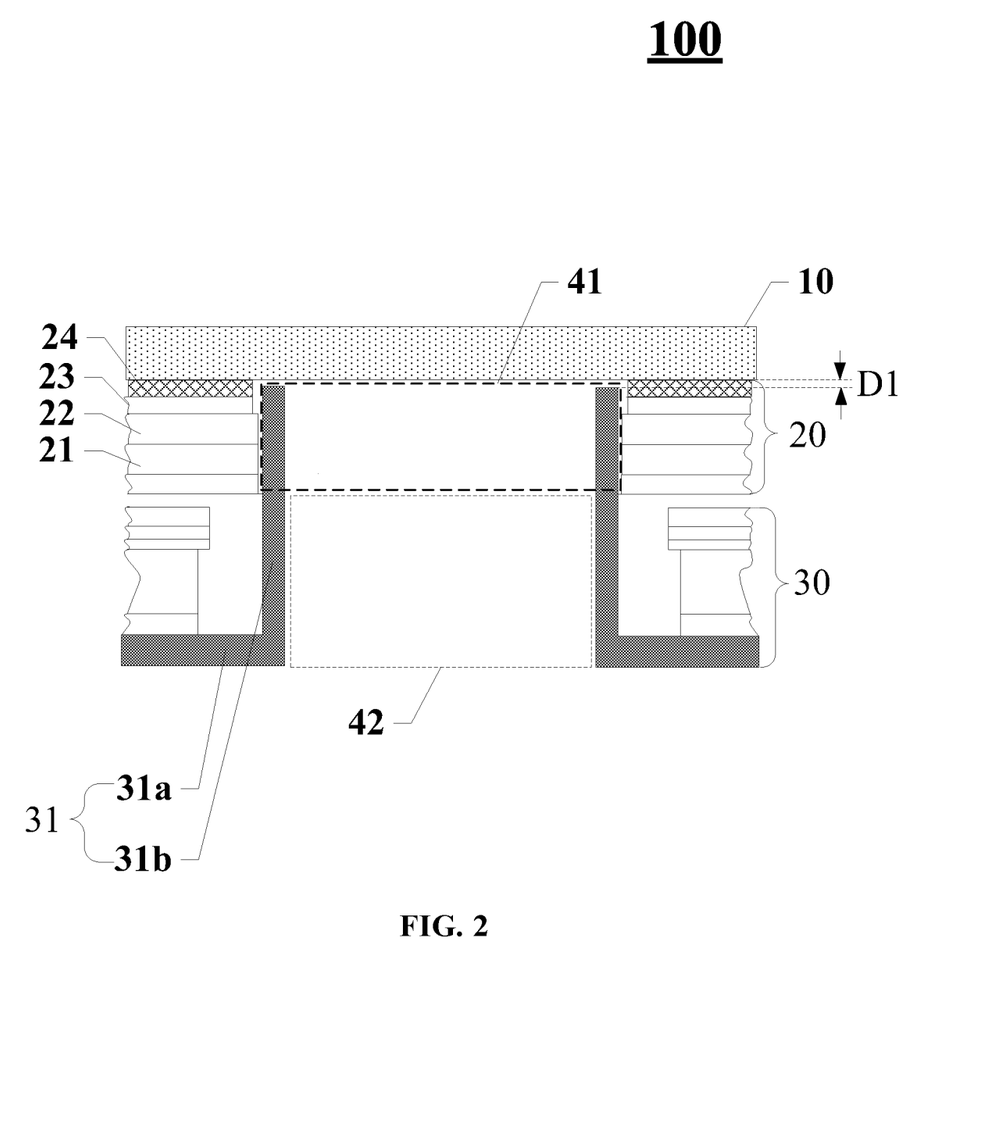
FIG. 2 illustrates an exemplary cross-section view of the display module in FIG. 1 along an AA' direction.
Figure 3:
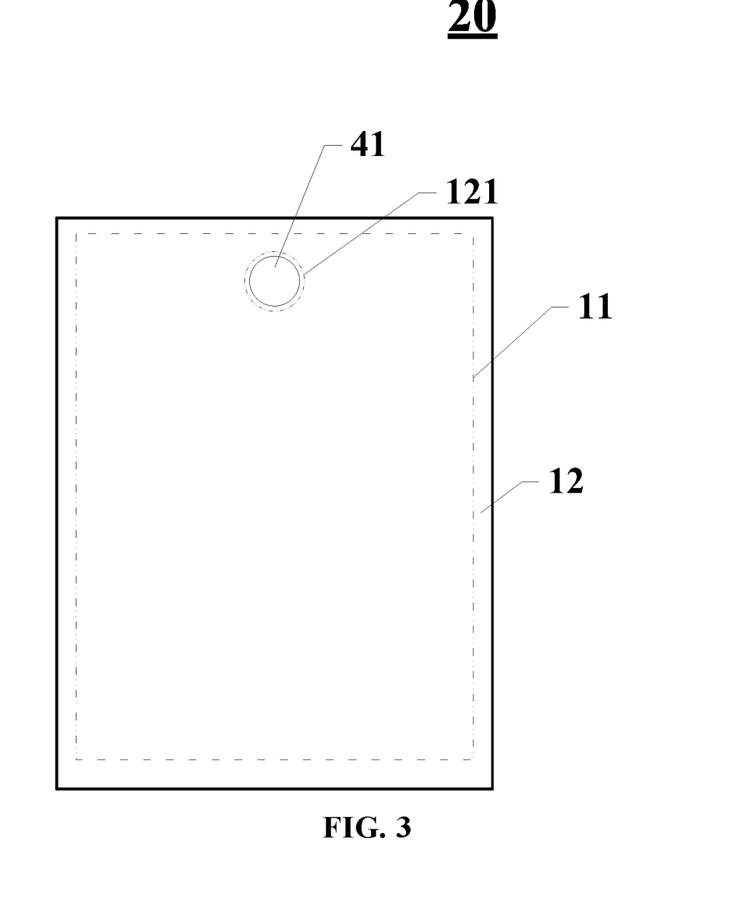
FIG. 3 illustrates a top view of an exemplary display panel consistent with various disclosed embodiments in the present disclosure.
Figure 4:
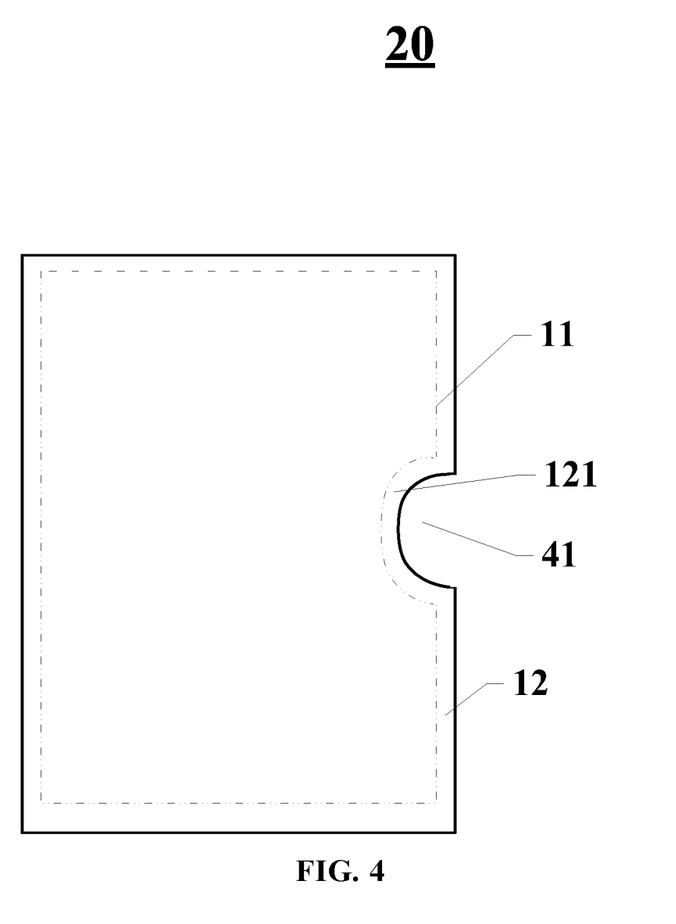
FIG. 4 illustrates a top view of another exemplary display panel consistent with various disclosed embodiments in the present disclosure.

FIG. 1 illustrates a top view of an exemplary display module consistent with various disclosed embodiments in the present disclosure; and FIG. 2 illustrates an exemplary cross-section view of the display module in FIG. 1 along an AA' direction. As illustrated in FIGS. 1-2, an embodiment of the present disclosure may provide a display module 100. In the display module 100, a first non-display region 121 may surround at least one first hollowed-out part 41 and a display region 11 may surround the first non-display region 121. Correspondingly, the at least one first hollowed-out part 41 may be a through hole structure. FIG. 3 illustrates a top view of an exemplary display screen 20 provided by another embodiment in the present disclosure. In the display screen 20, the first non-display region 121 may partially surround (e.g., substantially semi-surround) the at least one first hollowed-out part 41 and the display region 11 may partially surround the first non-display region 121. Correspondingly, the at least one first hollowed-out part 41 may be a notch structure in FIG. 4 illustrating a top view of another exemplary display panel consistent with various disclosed embodiments in the present disclosure. An edge of the display screen 20 may be recessed toward an inside of the display region 11 to form the notch structure. The display module 100 where the position and structure of the through hole and/or the notch structure in the display module 100 are shown in FIGS. 3-4 is used as an example only to describe the present disclosure and should not limit the scope of the present disclosure. In various embodiments of the present disclosure, the through hole and/or the notch structure may be disposed at any positions in the display module 100 limited by the display region 11, and the present disclosure has no limit on the position. When the at least one hollowed-out part 41 is the through hole and the through hole is disposed at any positions in the display module 100 limited by the edge of the display region 11, the through hole may not occupy a space of an edge frame area in the display module 100, and a frame ratio of the display module 100 may be reduced. Correspondingly, a screen ratio of the display module 100 and a user experience of the display device may be improved. When the at least one hollowed-out part 41 is the notch structure, a full-screen design may be formed easily in the display module 100.

Following description will use the display module 100 where the first non-display region 121 may surround the at least one first hollowed-out part 41 and the display region 11 may surround the first non-display region 121 (that is the at least one hollowed-out part 41 is the through hole) as an example.

As illustrated in FIGS. 1-3, the display module 100 may include: a cover plate 10, a display screen 20 disposed at a side of the cover plate 10, and a backlight module 30. The display screen 20 may include a display region 11, a first non-display region 121, and at least one first hollowed-out part 41. The at least one first hollowed-out part 41 may penetrate through the display screen 20 along a thickness direction of the display screen 20. The first non-display region 121 may surround the at least one hollowed-out part 41, and the display region 11 may surround the first non-display region 121. The backlight module 30 may be disposed at a side of the display screen 20 away from the cover plate 10, and may include at least one second hollowed-out part 42 corresponding to the at least one first hollowed-out part 41. The at least one hollowed-out part 42 may penetrate through the backlight module 30 along a thickness direction of the backlight module 30. The backlight module 30 may further include a metal frame 31. The metal frame may include a main part 31a corresponding to the display region 11 and a first bending part 31b. The first bending part 31b may be connected to the main part 31a and may be disposed on inner sidewalls of the at least one second hollowed-out part 42. The first bending part 31b may be opaque and may intersect a plane for the main part 31a. One end of the first bending part 31b away from the main part 31a may extend inside the at least one first hollowed-out part 41.

In one embodiment, the backlight module 30 in the display module 100 may be disposed at a side of the display screen 20 away from a light-emitting surface to provide light for the display screen 20. The at least one second hollowed-out part 42 in the backlight module 30 may have a one-to-one correspondence in position with the at least one first hollowed-out part 41 in the display screen 20. For description purposes only, FIG. 1 and FIG. 3 illustrate an embodiment of the present disclosure where the display screen 20 includes one first hollowed-out part 41 and the backlight module 30 includes one second hollowed-out part 42 as an example. This should not limit the scopes of the present disclosure. In other embodiments of the present disclosure, the display screen 20 may include a plurality of first hollowed-out parts 41 and the backlight module 30 may include a plurality of second hollowed-out parts 42 correspondingly. Also, the at least one first hollowed-out part 41 and the at least one second hollowed-out part 42 may have any suitable shape and size according to a design demand of the display module, and the present disclosure has no limit on this.

As illustrated in FIGS. 1-3, in one embodiment, in the display module 100, the display screen 20 may include one first hollowed-out part 41 penetrating through the display screen 20 along a thickness direction of the display screen 20. The backlight module 30 may include one second hollowed-out part 42 penetrating through the backlight module 30 along the thickness direction of the backlight module 30. The first hollowed-out part 41 and the second hollowed-out part 42 may have a one-to-one correspondence in position. As illustrated in FIG. 2, except the cover plate 10, the display screen 20 and the backlight module 30 may be both hollowed out at a position corresponding to the first hollowed-out part 41 and the second hollowed-out part 42. In the metal frame 31 of the backlight module 30, an extending part connected to a base may extend toward the cover plate 10 and extend inside the first hollowed-out part 41 of the display screen 20. Since the first bending part 31b may be opaque, after the first bending part 31b extends to form a first extending part, the first bending part 31b may block light beams and prevent light beams emitted by the backlight module 30 from leaking out to the position corresponding to the first hollowed-out part 41 and the second hollowed-out part 42. An amount of the light beams leaking out to the position corresponding to the first hollowed-out part 41 and the second hollowed-out part 42 may be reduced. After disposing cameras at the position corresponding to the first hollowed-out part 41 and the second hollowed-out part 42, the light beams emitted by the backlight module 30 may have no influence on an optical effect of the cameras because of an extending design of the first bending part 31b. The performance of the display device may be improved.

In the display module 100 provided by some embodiments, there is no adhesive frame between the plane of the main part 31a and the cover plate 10 in the backlight module 30 at a position corresponding to the first non-display region 121.

As illustrated in FIG. 2, only the first bending part 31b blocking light instead of the adhesive frame may be disposed between the plane of the main part 31a and the cover plate 10 in the backlight module 30 at the position corresponding to the first non-display region 121. Not only the light beams emitted by the backlight module 30 may be blocked effectively from leaking out to the position corresponding to the first hollowed-out part 41 and the second hollowed-out part 42, but also a width of the frame corresponding to the first non-display region 121 may be reduced significantly. The display module 100 correspondingly may have a narrow frame and a screen ratio of the display module 100 may be improved. In some other embodiments, the adhesive frame may be disposed between the plane of the main part 31a and the cover plate 10 in the backlight module 30 at the position corresponding to the first non-display region 121, and the present disclosure has no limit on this.

As illustrated in FIG. 2, in the display module 100, a distance between the one end of the first bending part 31b away from the main part 31a in the metal frame 31 of the backlight module 30 and the cover plate 10 may be designated as D1 and D1 may be smaller than or equal to 1 mm.

In one embodiment, the one end of the first bending part 31b away from the main part 31a in the metal frame 31 of the backlight module 30 may be extended close to the cover plate 10, and the distance D1 between the one end of the first bending part 31b away from the main part 31a in the metal frame 31 of the backlight module 30 and the cover plate 10 may be smaller than or equal to 1 mm. The first bending part 31b and the cover plate 10 may be made of a rigid material. Since the distance D1 between the one end of the first bending part 31b away from the main part 31a in the metal frame 31 of the backlight module 30 and the cover plate 10 is larger than 0, the first bending part 31b may not contact the cover plate 10 directly. When the display module 100 is pressed by an external force, a buffer space between the first bending part 31b and the cover plate 10 may alleviate damages on the display module due to a direct contact between the first bending part 31b and the cover plate 10. Since the distance D1 between the one end of the first bending part 31b away from the main part 31a in the metal frame 31 of the backlight module 30 and the cover plate 10 is smaller than or equal to 1 mm, the distance between the first bending part 31b and the cover plate 10 may be small. A part of the light beams emitted by the backlight module 30 may leak out to the position of the first hollowed-out part 41 and the second hollowed-out part 42 through a gap between the first bending part 31b and the cover plate 10. But since the gap between the first bending part 31b and the cover plate 10 may be small, the amount of the light beams leaking out to the position of the first hollowed-out part 41 and the second hollowed-out part 42 may be small too. After disposing the cameras at the position corresponding to the first hollowed-out part 41 and the second hollowed-out part 42, an influence of the light beams emitted by the backlight module 30 on the optical effect of the cameras may be suppressed because the gap between the first bending part 31b and the cover plate 10 may be small. The performance of the display device may be improved.

In other embodiments, the distance D1 between the one end of the first bending part 31b away from the main part 31a in the metal frame 31 of the backlight module 30 and the cover plate 10 may be 0<D1≤0.1 mm. Since the distance D1 between the one end of the first bending part 31b away from the main part 31a in the metal frame 31 of the backlight module 30 and the cover plate 10 is smaller than or equal to 0.1 mm, the gap between the first bending part 31b and the cover plate 10 may be small. The amount of the light beams leaking to the position of the first hollowed-out part 41 and the second hollowed-out part 42 through the gap between the first bending part 31b and the cover plate 10 may be reduced further. After disposing the cameras at the positions corresponding to the first hollowed-out part 41 and the second hollowed-out part 42, an influence of the light beams emitted by the backlight module 30 on the optical effect of the cameras may be suppressed because the gap between the first bending part 31b and the cover plate 10 may be small. The performance of the display device may be improved.

Figure 5:
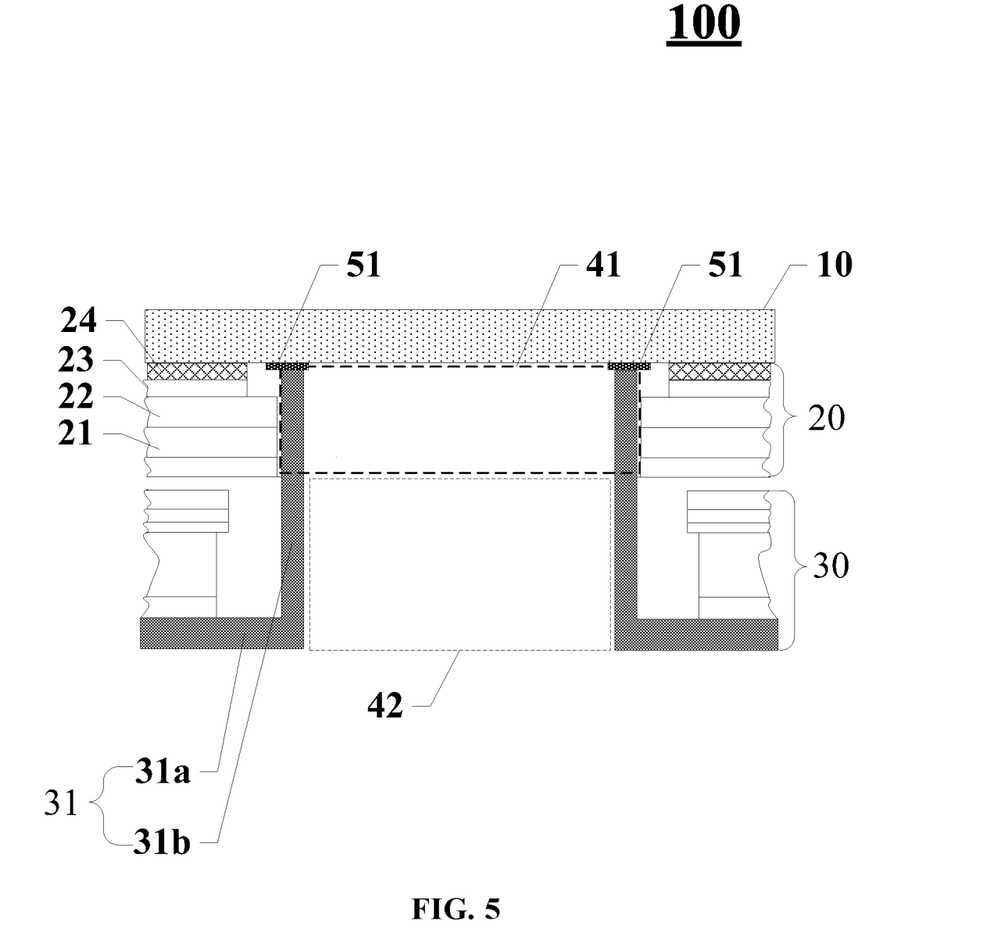
FIG. 5 illustrates another exemplary cross-section view of the display module in FIG. 1 along the AA' direction.

FIG. 5 illustrates another exemplary cross-section view of the display module 100 in FIG. 1 along the AA' direction. The backlight module 30 may further include a first light-blocking object 51 disposed between the one end of the first bending part 31b away from the main part 31a and the cover plate 10.

By disposing the first light-blocking object 51 between the one end of the first bending part 31b away from the main part 31a and the cover plate 10, the gap between the first bending part 31b and the cover plate 10 may be sealed by the first light-blocking object 51. A path of the light beams propagating from the backlight module 30 to the position of the first hollowed-out part 41 and the second hollowed-out part 42 may be blocked. The amount of the light beams leaking to the position of the first hollowed-out part 41 and the second hollowed-out part 42 through the gap between the first bending part 31b and the cover plate 10 may be reduced further. The performance of the display device may be improved.

Figure 6:
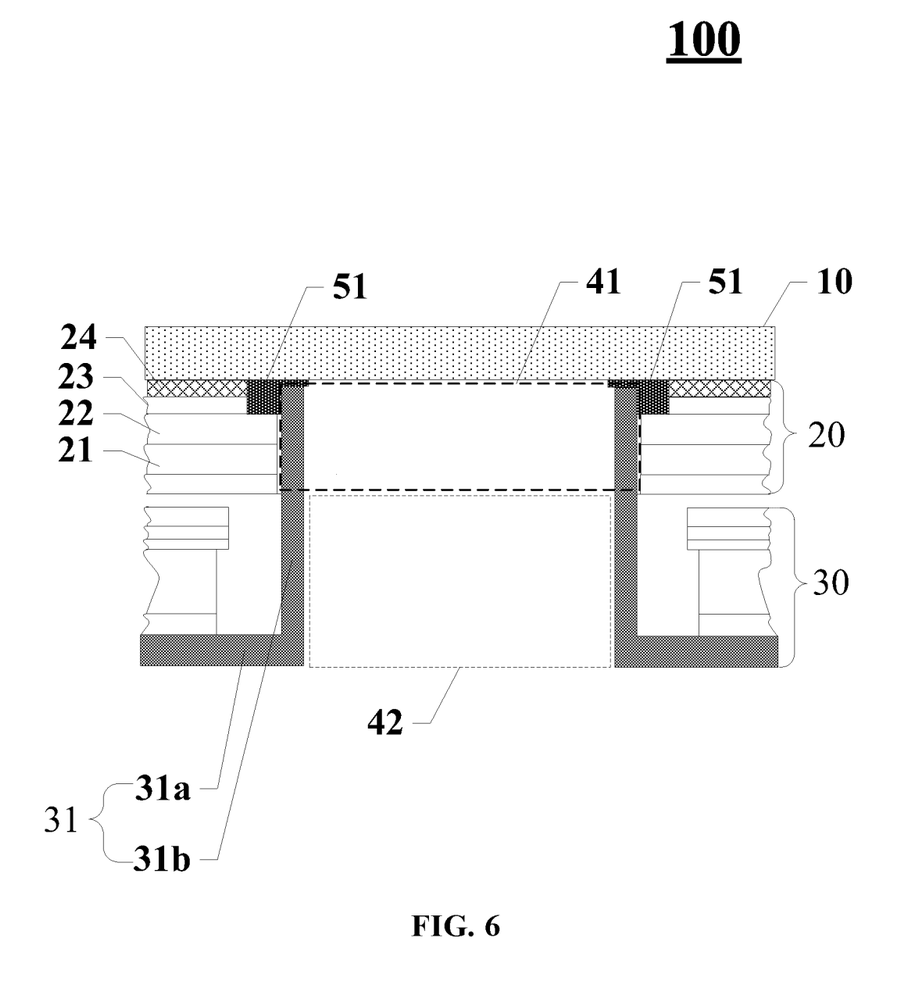
FIG. 6 illustrates another exemplary cross-section view of the display module in FIG. 1 along the AA' direction.

FIG. 6 illustrates another exemplary cross-section view of the display module 100 in FIG. 1 along the AA' direction. The display screen 20 in the display module 100 may further include display panels 21 and 22, and a polarizer 23. The polarizer 23 may be disposed at a side of the display panel 22 facing toward the cover plate 10 and may be fixed to the cover plate 10 by an optical glue 24.

The first light-blocking object 51 may at least cover a side of the polarizer 23 and a side of the optical glue 24 facing toward the first hollowed-out part 41.

In one embodiment, the first light-blocking object 51 may not only be disposed in the gap between the first bending part 31b and the cover plate, but also extend to the one side of the polarizer 23 and the one side of the optical glue 24 facing toward the first hollowed-out part 41. Correspondingly, the first light-blocking object 51 may prevent the light beams emitted by the backlight module 30 leaking out to the position of the first hollowed-out part 41 and the second hollowed-out part 42 through the gap between the first bending part 31b and the cover plate 10 and may block the light beams leaking out from sides of the polarizer 23 and the optical glue 24. When the light beams emitted by the backlight module 30 propagate to the cover plate 10 through the polarizer 23 and the optical glue 24, the light beams may not leak out from the sides of the polarizer 23 and the optical glue 24 since the first light-blocking object 51 may at least cover the one side of the polarizer 23 and the optical glue 24 facing toward the first hollowed-out part 41. An effective utilization efficiency of the light beams emitted by the backlight module 30 may be improved. The first light-blocking object 51 may be made of a colloid which is plastic. When the cover plate 10 of the display module 100 is pressed by an external force, the first light-blocking object 51 may become a buffer between the first bending part 31b and the cover plate 10. The external force may be released and a hard contact between the first bending part 31b and the cover plate 10 may be avoided. The damage on the display module 100 may be damaged when the cover plate 100 is subjected to the external force may be reduced.

In some embodiments, the display panel 21 may be an array panel and the display panel 22 may be a colorful film panel. The present disclosure is described by using a display module where the array panel and the colorful film panel are disposed in a positional relationship shown in FIG. 6 as an example only. It should not limit the actual structure of the display module and scopes of the present disclosure.

In one embodiment, the first light-blocking object 51 of the display module 100 may be a first light-blocking glue. When the first light-blocking object 51 uses the first light-blocking glue, the first light-blocking glue may be formed by a glue dipping method. Amount and positions of the glue may be controlled precisely by a glue dipping machine. This process may be simple and the first light-blocking glue after solidification can block light effectively. A possibility that the light beams leak out to the position of the first hollowed-out part 41 and the second hollowed-out part 42 through the gap between the first bending part 31b and the cover plate 10 may be reduced further.

Figure 7:
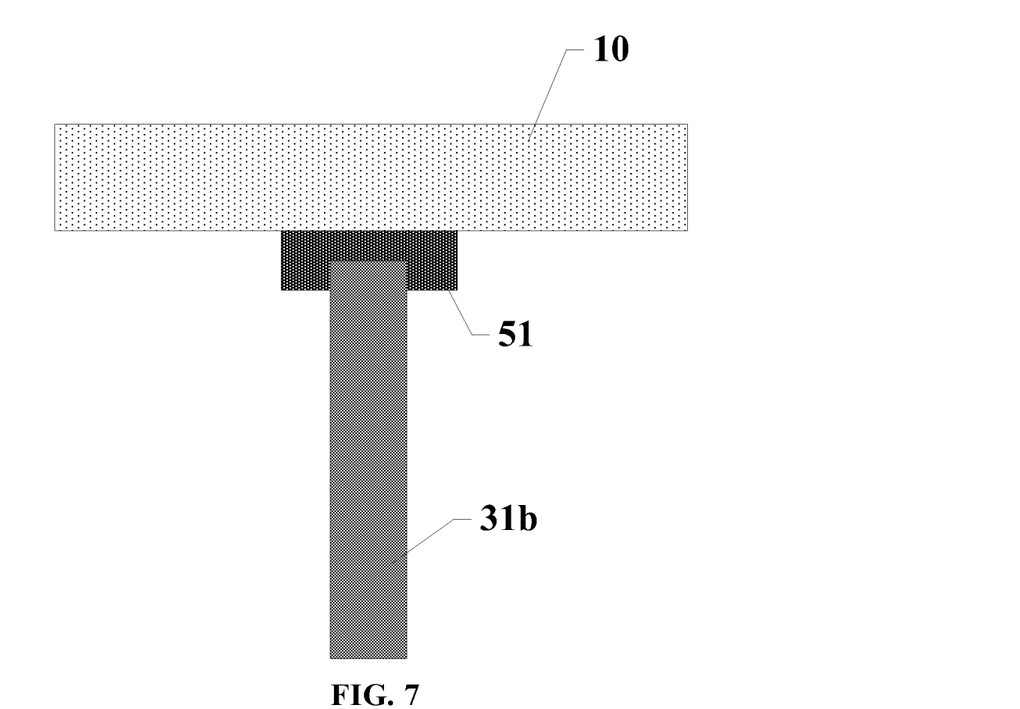
FIG. 7 illustrates an exemplary structure of a first bending part, a first light-blocking glue, and a cover plate in an exemplary display module consistent with various disclosed embodiments in the present disclosure.

In one embodiment, the first light-blocking glue and the one end of the first bending part 31a away from the main part 31a in the display module 100 may be fixed under an interference fit. FIG. 7 illustrates an exemplary structure of the first bending part 31b, the first light-blocking glue, and the cover plate 10 in a display module provided by one embodiment in the present disclosure. The first light-blocking glue may be plastic after solidification, and the first bending part 31b may be made of a rigid material. A force may be applied to the one end of the first bending part 31b away from the main part 31a and the first light-blocking glue, to form a fit between the one end of the first bending part 31b and the first light-blocking glue under an interference fit. A path of the light beams emitted by the backlight module 30 to the position of the first hollowed-out part 41 and the second hollowed-out part 42 may be blocked further. After disposing the cameras at the positions corresponding to the first hollowed-out part 41 and the second hollowed-out part 42, an influence of the light beams emitted by the backlight module 30 on the optical effect of the cameras may be suppressed because the gap between the first bending part 31b and the cover plate 10 may be small. The performance of the display device may be improved.

In other embodiment, the first light-blocking object 51 between the cover plate 10 and the first bending part 31b may be made of a light-blocking foam. The light-blocking foam may block light effectively and prevent the light beams emitted by the backlight module 30 from leaking to the position of the first hollowed-out part 41 and the second hollowed-out part 42. Besides that, the light-blocking foam may be plastic. When the cover plate 10 of the display module 100 is pressed by an external force, the first light-blocking object 51 may become a buffer between the first bending part 31b and the cover plate 10. The external force may be released and a hard contact between the first bending part 31b and the cover plate 10 may be avoided. A possibility that the display module 100 may be damaged when the cover plate 100 is subjected to the external force may be reduced. The light-blocking foam may belong to a colloid material. When the first light-blocking object 51 between the cover plate 10 and the first bending part 31b may be made of the light-blocking foam, the light-blocking foam may be used to fix the first bending part 31b and the cover plate 10. Reliability of fixation of the first bending part 31b may be improved.

Figure 8:
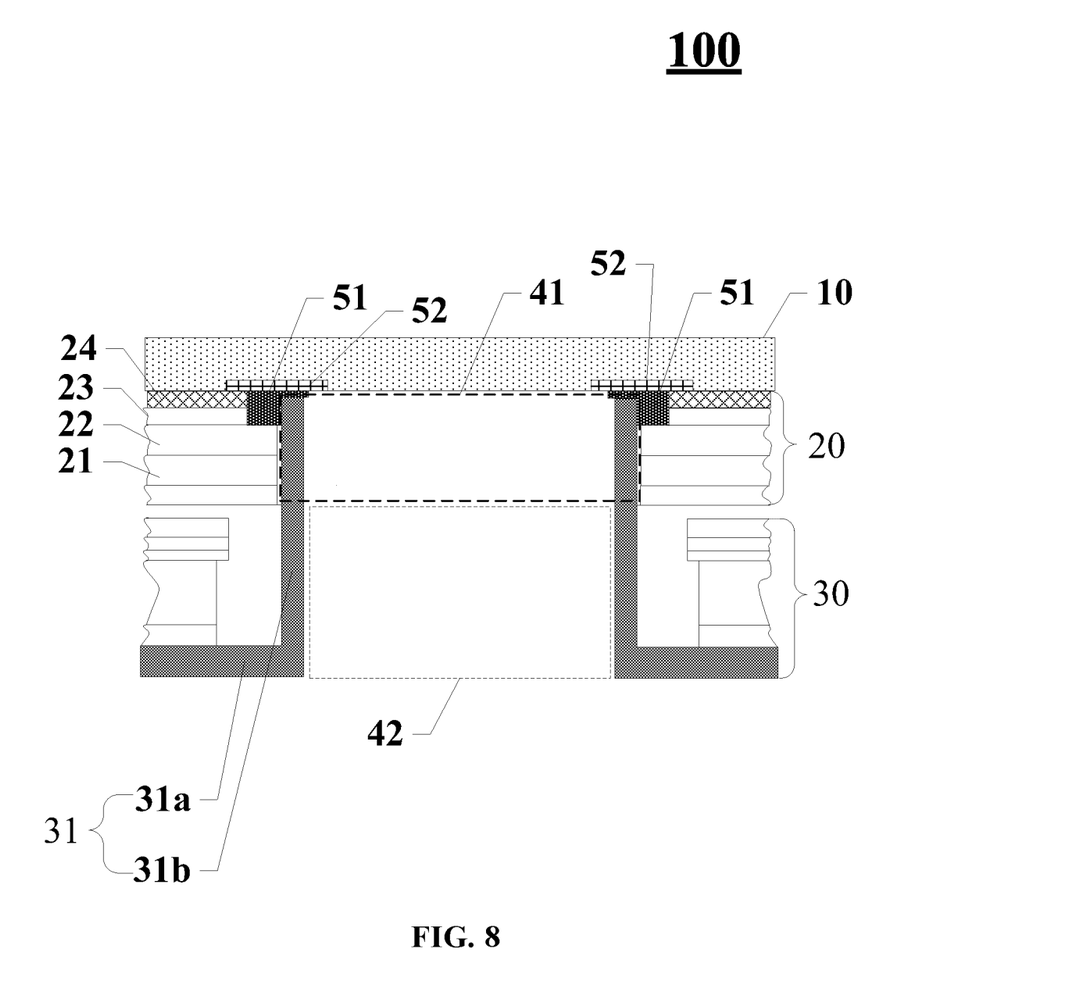
FIG. 8 illustrates another exemplary cross-section view of the display module in FIG. 1 along the AA' direction.

FIG. 8 illustrates another exemplary cross-section view of the display module 100 in FIG. 1 along the AA' direction. In one embodiment, the display module 100 may further include a second light-blocking object 52 at a position corresponding to the first non-display region 121 on a side of the cover plate 10 facing toward the display screen 20.

In one embodiment, the second light-blocking object 52 may be disposed on the one side of the cover plate 10 facing toward the display screen 20. The second light-blocking object 52 may be disposed in the first non-display region 121. A part of a surface of the optical glue 24 toward the cover plate 10 in the first non-display region 121 may be at least partially covered by the second light-blocking object 52. The second light-blocking object 52 may also cover a surface of the first light-blocking object 52 facing toward the cover plate 10. After forming the second light-blocking object 52, the second light-blocking object 52 and the first light-blocking object 52 may work together to suppress the light beaming leaking out from sides of the polarizer 23 and the optical glue 24.

In one embodiment, the second light-blocking object 52 on the one side of the cover plate 10 facing toward the display screen 20 may be an ink coated on the one side of the cover plate 10 facing toward the display screen 20. The cover plate 10 may be made of a transparent glass or another transparent material. The ink may be easily coated on the cover plate 10 made of a transparent glass or another transparent material. The light leak may be avoided effectively, and the performance of the display device may be improved. Ink coating may be achieved in the current process. A fabrication process for the display device may be simplified and production efficiency may be improved.

Figure 9:
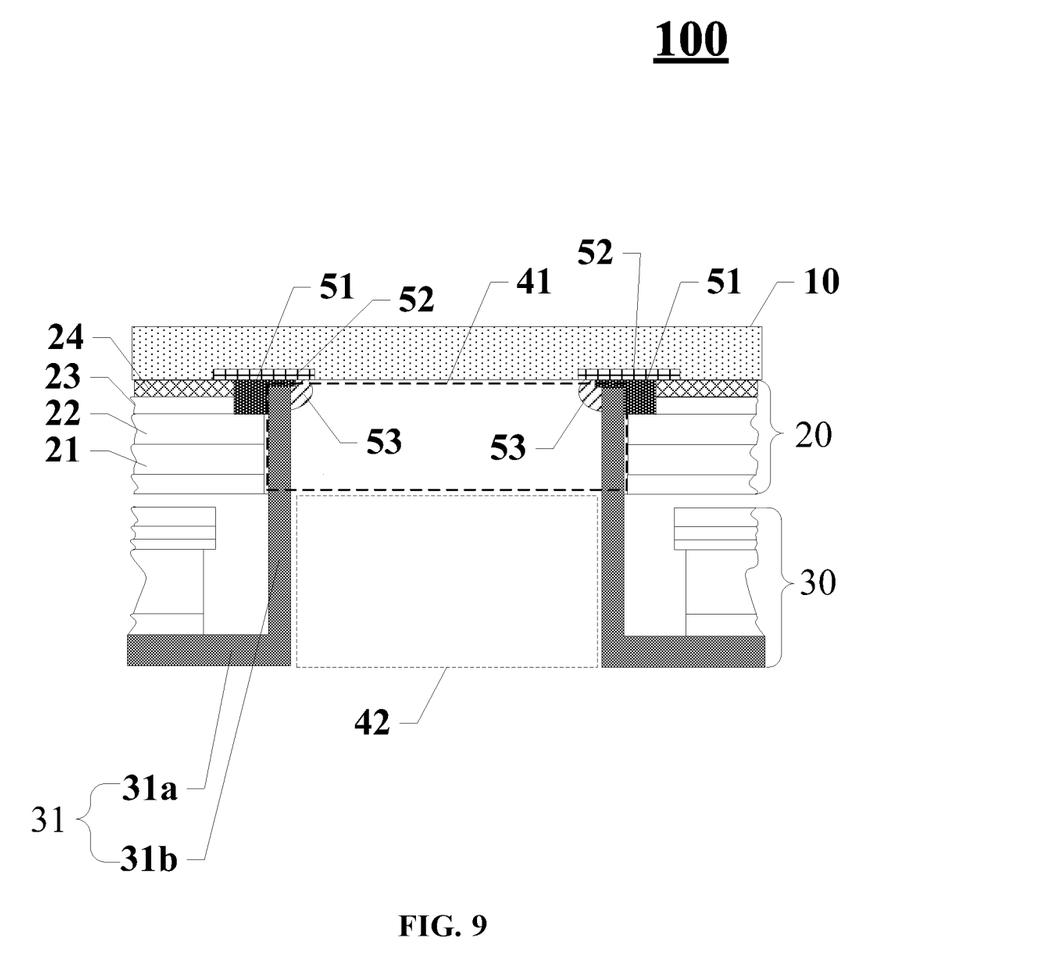
FIG. 9 illustrates another exemplary cross-section view of the display module in FIG. 1 along the AA' direction.

FIG. 9 illustrates another exemplary cross-section view of the display module 100 in FIG. 1 along the AA' direction. In one embodiment, the backlight module 30 in the display module 100 may further include a second light-blocking glue 53 and the first bending part 31b may be fixed to the cover plate 10 by the second light-blocking glue 53.

In one embodiment, the second light-blocking glue 53 may be formed in the display module 100, and the first bending part 31b may be fixed to the cover plate 10 by the second light-blocking glue 53. Assembly reliability of the display module 100 may be improved. The second light-blocking glue 53, the first light-blocking object 51 and the second light-blocking object 52 may together block the light beams. The amount of the light beams emitted by the backlight module 30 leaking out to the position of the first hollowed-out part 41 and the second hollowed-out part 42 may be reduced further. A part of the light beams propagating to the cover plate 10 through the polarizer 23 and the optical glue 24 may also leak out to the position of the first hollowed-out part 41 and the second hollowed-out part 42. The amount of the light beams leaking out may also be reduced. The display performance of the display module 100 may be improved. After disposing the cameras at the positions corresponding to the first hollowed-out part 41 and the second hollowed-out part 42, the performance of the display device may be improved.

As illustrated in FIG. 9, the second light-blocking glue 53 in the display module 100 may be disposed at least at sides of the first bending part 31b facing toward the second hollowed-out part 42 and at one side of the cover plate 10 facing toward the display screen 20. That is the second light-blocking glue 53 in the display module 100 may be disposed at sides of the first bending part 31b facing toward the first hollowed-out part 41 and at one side of the cover plate 10 facing toward the display screen 20. Correspondingly, the second light-blocking glue 53 may be formed at contact positions between the first bending part 31b and the cover plate 10. Only a small amount of the second light-blocking glue 53 may be needed to fix the first bending part 31b and the cover plate 10. A cost of the display module 100 may be reduced to achieve an effective light blocking.

In one embodiment, the main part 31a and the first bending part 31b in the display module 100 may be formed from one single piece or may be mechanically connected to each other. When the main part 31a and the first bending part 31b in the display module 100 is formed from one single piece, the main part 31a and the first bending part 31b may be made of a same material and may be formed from one single piece in a same process. Separated processes to form the main part 31a and the first bending part 31b may be avoided, a production time and a production efficiency may be improved. In other embodiments, the main part 31a and the first bending part 31b may be formed independently and then may be connected to each other mechanically. The present disclosure has no limit on a process for forming the main part 31a and the first bending part 31b. When using the mechanical connection, the main part 31a and the first bending part 31b may be formed independently, and a thickness of the first bending part 31b (a distance between the one side of the first bending part 31b facing toward the first hollowed-out part and another side of the first bending part 31b away from the first hollowed-out part) may be small, and a height of the first bending part 31b (a distance between one end of the first bending part 31b close to the main part 31a and another end of the first bending part 31b away from the main part 31a) may be large. The formed main part 31a and the first bending part 31b can meet diverse demands of the backlight modules with different size. In various embodiments, the mechanical connection may be a screw connection or a paste connection. The present disclosure has no limit on this.

In one embodiment, the first bending part 31b may be made of a metal. The metal usually is opaque. The first bending part 31b made of a metal may effectively prevent the light beams emitted by the backlight module from leaking out to the position of the first hollowed-out part 41 and the second hollowed-out part 42, and the performance of the display device may be improved. In other embodiments, the first bending part 31b may be made of a material which has a certain rigidity and can block light, including a metal oxide, an alloy, and/or a polymer. The present disclosure has no limit on the material of the first bending part 31b.

Figure 10:
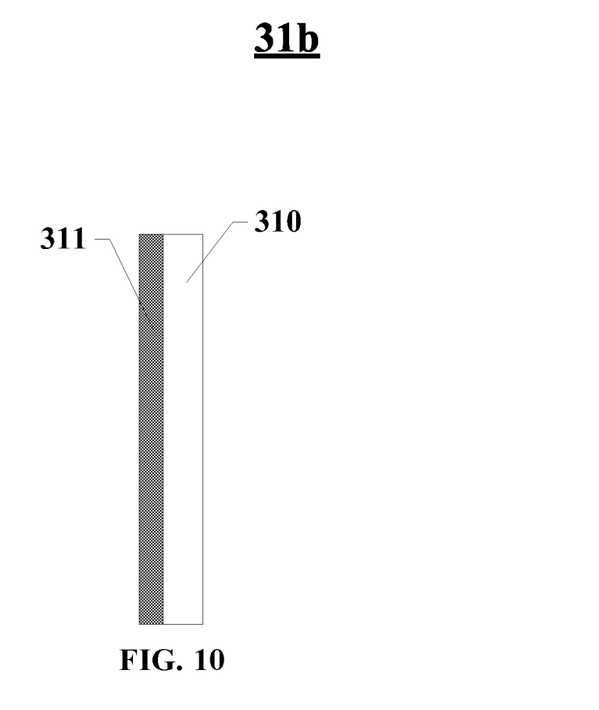
FIG. 10 illustrates an exemplary first bending part in an exemplary backlight module consistent with various disclosed embodiments in the present disclosure.

In one embodiment, the first bending part 31b in the backlight module 30 may further include a base 310 and a light-blocking material layer 311 coated partially on a side of the base 310 away from the second hollowed-out part 32, in addition to using a metal to achieve light-blocking. FIG. 10 illustrates an exemplary first bending part in an exemplary backlight module consistent with various disclosed embodiments in the present disclosure. In the display module 100 illustrated in FIG. 10, the first bending part 31b may be formed by a base 310 and a light-blocking material layer 311. A side of the base 310 away from the second hollowed-out part 42 may be coated with the light-blocking material layer 311. The first bending part 31b then may block light beams. In other embodiment, another side of the base 310 facing toward the second hollowed-out part 42 may also be coated with the light-blocking material layer 311 to further improve a light-blocking performance of the first bending part 31b. The present disclosure has no limit on this. The light-blocking material layer 311 may be made of black nickel, ink, light-blocking paint, or any combination thereof.

Figure 11:
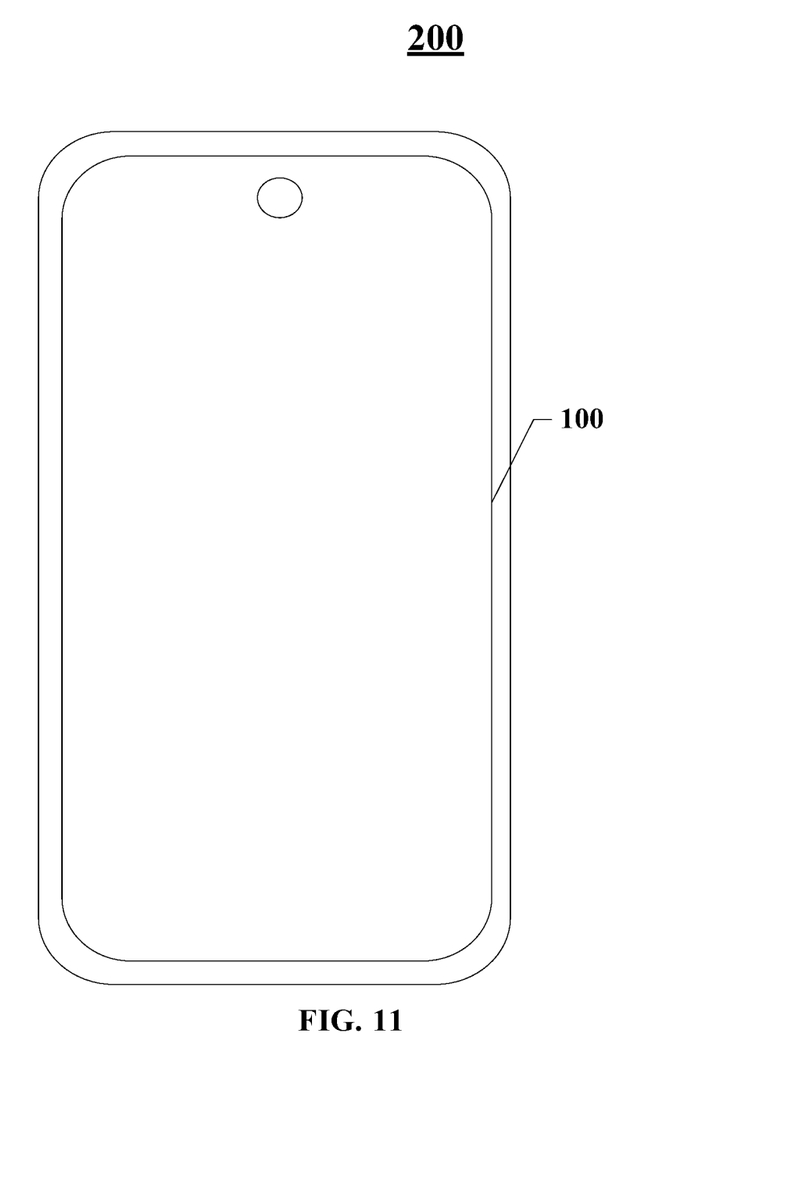
FIG. 11 illustrates an exemplary display device consistent with various disclosed embodiments in the present disclosure.

The present disclosure also provides a display device. As illustrated in FIG. 11, the display device 200 may include a display module 100. The display module 100 may be any one of display modules 100 provided by any embodiments of the present disclosure. The display device 200 provided by the present disclosure may be a cellphone, a tablet, a television, a monitor, a laptop, a digital frame, a navigator, and any one of other products or devices with a display function.

In the display module and display device provided by various embodiments of the present disclosure, the display screen may include the at least one first hollowed-out part and the backlight module may include the at least one second hollowed-out part. The at least one second hollowed-out part may be in a one-to-one correspondence with the at least one first hollowed-out part. The metal frame of the backlight module may include the main part and the first bending part connected with the main part. The first bending part may be opaque and may be disposed on the inner sidewalls of the at least one second hollowed-out part. The one end of the first bending part away from the main part may extend inside the at least one first hollowed-out part in the display screen. That is that the one side of the first bending part facing toward the display screen may be extended, so the one end of the first bending part away from the main part may exceed a plane for the one side of the display screen near the backlight module may extend inside the inside of the at least one first hollowed-out part. Since the first bending part may be opaque, an amount of the light beams emitted by the backlight module and leaking out to the position corresponding to the at least one hollowed-out part and the at least one second hollowed-out part may be small after the first bending part being extended. When disposing the cameras at the position corresponding to the at least one hollowed-out part and the at least one second hollowed-out part. The light beams emitted by the backlight module may have no influence on the optical effect of the cameras. The performance of the display device may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display module, comprising:
a cover plate;
a display screen, disposed on a side of the cover plate; and
a backlight module, disposed on a side of the display screen away from the cover plate;
wherein:
the display screen includes a display region, a first non-display region, and at least one first hollowed-out part;
the at least one first hollowed-out part penetrates through the display screen along a thickness direction of the display screen;
the first non-display region at least partially surrounds the at least one hollowed-out part;
the display region at least partially surrounds the first non-display region;
the backlight module includes at least one second hollowed-out part and a metal frame;
the at least one second hollowed-out part is disposed in a one-to-one correspondence with the at least one first hollowed-out part;
the at least one second hollowed-out part penetrates through the backlight module along a thickness direction of the backlight module;
the metal frame includes a main part corresponding to the display region and a first bending part connected to the main part;
the first bending part is disposed on inner sidewalls of the at least one second hollowed-out part, and is opaque;
the first bending part intersects a plane for the main part; and
one end of the first bending part away from the main part extends inside the at least one first hollowed-out part.

2. The display module according to claim 1, wherein:
at a position in the backlight module corresponding to the first non-display region, a adhesive frame is absent between the plane for the main part and a plane for the cover plate.

3. The display module according to claim 1, wherein:
a distance D1 between the one end of the first bending part away from the main part and the cover plate is 0<D1≤1 mm.

4. The display module according to claim 3, wherein the distance D1 between the one end of the first bending part away from the main part and the cover plate is 0<D1≤0.1 mm.

5. The display module according to claim 1, wherein the backlight module further includes a first light-blocking object between the one end of the first bending part away from the main part and the cover plate.

6. The display module according to claim 5, wherein:
the display screen includes a display panel and a polarizer;
the polarizer is disposed at one side of the display panels adjacent to the cover plate;
the polarizer is fixed to the cover plate by an optical glue; and
the first light-blocking object further covers at least one side of the polarizer facing toward the at least one first hollowed-out part and at least one side of the optical glue facing toward the at least one first hollowed-out part.

7. The display module according to claim 5, wherein:
the first light-blocking object is made of a first light-blocking glue.

8. The display module according to claim 7, wherein:
the first light-blocking glue and the one end of the first bending part away from the main part are fixed under an interference fit.

9. The display module according to claim 5, wherein the first light-blocking object is made of a light-blocking foam.

10. The display module according to claim 1, wherein a second light-blocking object is disposed at a position in one side of the cover plate facing toward the display screen and corresponding to the first non-display region.

11. The display module according to claim 10, wherein the second light-blocking object is an ink layer coated on the one side of the cover plate facing toward the display screen.

12. The display module according to claim 1, wherein:
the backlight module further includes a second light-blocking glue; and
the first bending part is fixed to the cover plate by the second light-blocking glue.

13. The display module according to claim 12, wherein the second light-blocking glue is at least disposed at a side of the first bending part facing toward the at least one second hollowed-out part and at the one side of the cover plate facing toward the display screen.

14. The display module according to claim 1, wherein:
the at least one first hollowed-out part is a through hole structure;
the first non-display region surrounds the through hole structure; and
the display region surrounds the first non-display region.

15. The display module according to claim 1, wherein:
the at least one first hollowed-out part is a notch structure;
the first non-display region partially surrounds the notch structure; and
the display region partially surrounds the first non-display region.

16. The display module according to claim 1, wherein the main part and the first bending part are formed in one single piece or are mechanically connected to each other.

17. The display module according to claim 1, wherein the first bending part is made of a metal.

18. The display module according to claim 1, wherein:
the first bending part includes a base and a light-blocking material layer at least coated on a side of the base away from the at least one second hollowed-out part.

19. A display device, comprising the display module including a cover plate, a display screen disposed on a side of the cover plate and a backlight module disposed on a side of the display screen away from the cover plate;
wherein:
the display screen includes a display region, a first non-display region, and at least one first hollowed-out part;
the at least one first hollowed-out part penetrates through the display screen along a thickness direction of the display screen;
the first non-display region at least partially surrounds the at least one hollowed-out part;
the display region at least partially surrounds the first non-display region;
the backlight module includes at least one second hollowed-out part and a metal frame;
the at least one second hollowed-out part is disposed in a one-to-one correspondence with the at least one first hollowed-out part;
the at least one second hollowed-out part penetrates through the backlight module along a thickness direction of the backlight module;
the metal frame includes a main part corresponding to the display region and a first bending part connected to the main part;
the first bending part is disposed on inner sidewalls of the at least one second hollowed-out part, and is opaque;
the first bending part intersects a plane for the main part; and
one end of the first bending part away from the main part extends inside the at least one first hollowed-out part.

* * * * *